Nov. 6, 1962      D. C. R. BAILEY, SR      3,062,332
TRAILER CONNECTOR AND BRAKE ACTUATING MECHANISM
Filed June 5, 1958      3 Sheets-Sheet 1
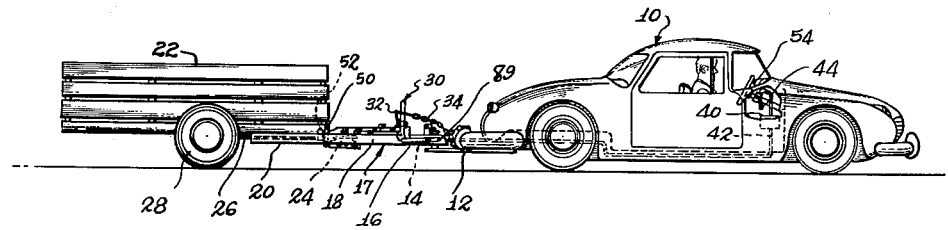
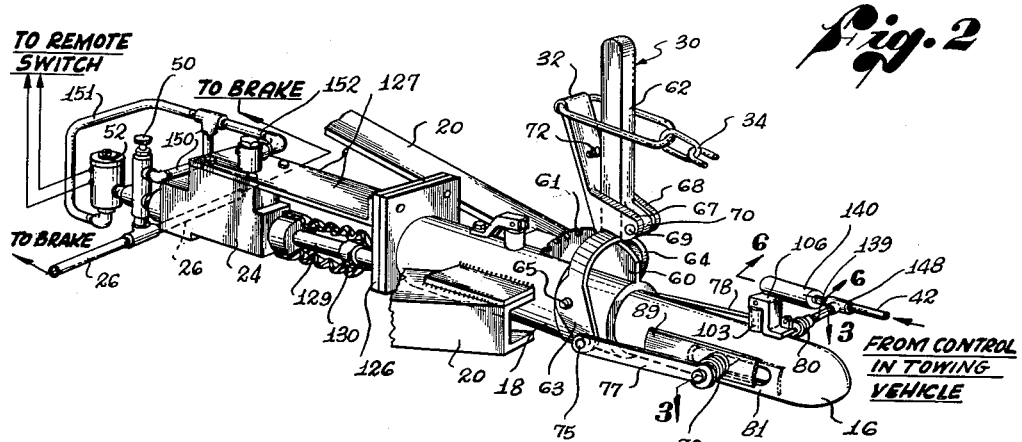
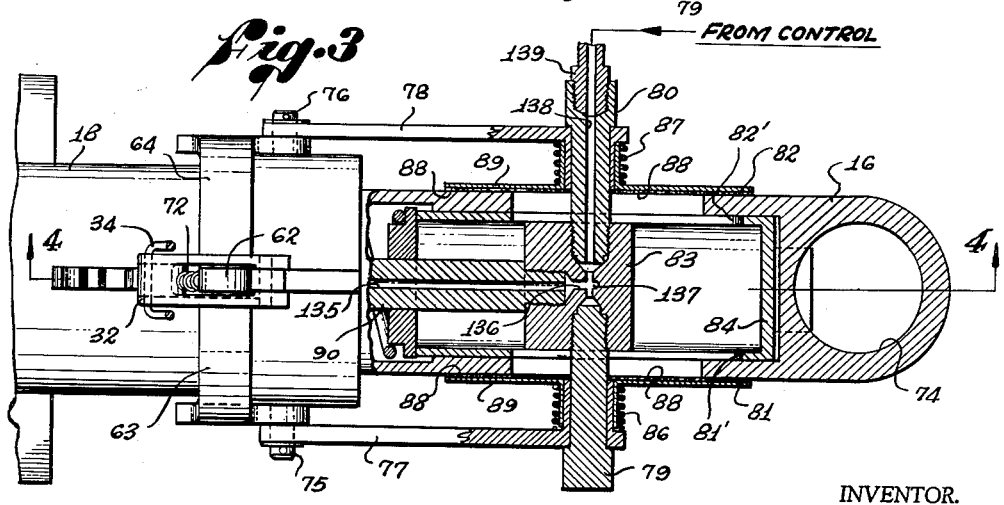
INVENTOR.
DAVID CLARENCE R. BAILEY SR
Attorneys

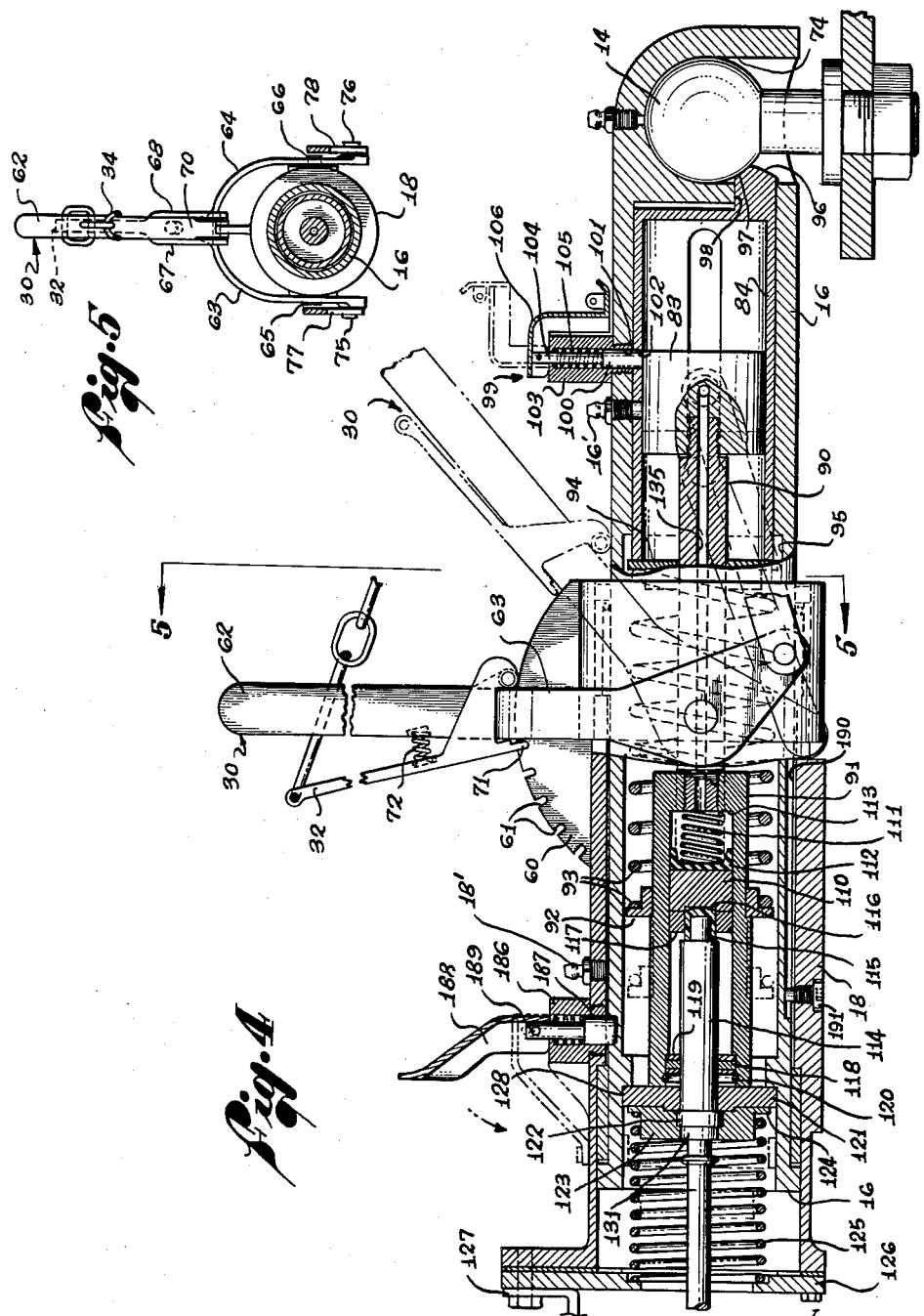

Nov. 6, 1962 D. C. R. BAILEY, SR 3,062,332
TRAILER CONNECTOR AND BRAKE ACTUATING MECHANISM
Filed June 5, 1958 3 Sheets-Sheet 3

INVENTOR.
DAVID CLARENCE R. BAILEY SR.
Attorneys 3,062,332
TRAILER CONNECTOR AND BRAKE ACTUATING
MECHANISM
David Clarence R. Bailey, Sr., 1146 E. 33rd St.,
Los Angeles, Calif.
Filed June 5, 1958, Ser. No. 740,142
4 Claims. (Cl. 188—112)

This invention relates to braking means for a vehicle which is towed by another vehicle, and more particularly to an improved brake actuating mechanism or trailer hitch for trailers towed by tractors, automobiles and the like.

Numerous trailer hitches have heretofore been devised to provide braking action for a trailer upon deceleration of the towing vehicle with respect to the trailer. However, such mechanisms are unsatisfactory in many respects. For example, none has been devised which operates in a satisfactory positive manner during an emergency to operate the trailer brakes independently of deceleration of the towing vehicle with respect to the trailer.

The type of emergency calling for such independently operable means is one in which the trailer is towed rapidly around a sharp curve. In this situation, the trailer tends to veer off the road. Such tendency causes it to sway and exert great strain on the mechanical parts of the hitch connecting it to the towing vehicle. These parts will snap under severe strain, whereupon the trailer will whip off the road and turn over, and may cause loss of lives and property.

For such situations, the importance of means for selectively applying the brakes of the trailer independently cannot be overemphasized. Such means would permit the driver of the towing vehicle to apply the trailer brakes gradually upon starting around a dangerous curve, thereby to create a drag on the towing vehicle to help insure that both vehicles will proceed at a safe speed.

A further disadvantage of conventional trailer hitches resides in their lack of adjustability to permit loads of different sizes to be backed up by the towing vehicle. Usually, the consumer acquires a trailer hitch in which cooperating parts connected to the trailer and the towing vehicle are maintained under a tension which will permit backing up with loads below a predetermined maximum. If the consumer desires to use a heavier trailer, he must acquire a trailer hitch in which the cooperating parts are adapted to permit loads of that magnitude to be backed up.

Still another disadvantage of the conventional trailer hitches resides in the conventional ball and socket connection used in coupling the trailer to the towing vehicle. The end of the trailer hitch to be attached to the towing vehicle has a spherical opening or socket to receive a ball member which is fixed to the towing vehicle. The usual manner of effecting the coupling is to position the hitch with the socket over the ball member, and then lower the hitch until the ball member is seated in the socket.

After the conventional ball and socket connection is effected, friction and the force of gravity are relied on to keep the parts in locking engagement. However, and as is well known, this is often ineffective. The towing vehicle and the trailer occasionally become disengaged, as where they are traveling over an undulating surface so that the trailer hitch is lifted off the ball member, or the ball member moves downwardly and clear of the socket.

It is a primary object of this invention to provide an improved mechanism for towing a vehicle which is more effective for controlling brakes on such vehicle than mechanisms heretofore employed for this purpose.

It is another object of this invention to provide an improved trailer hitch which operates automatically to set the brakes in a trailer unit when the towing vehicle is going at a slower rate than the trailer vehicle, and in which the mechanism is equipped with hydraulically operated apparatus selectively operable from the towing vehicle for applying the brakes of the trailer independently of the automatic operation thereof.

Still another object of this invention is to provide an improved trailer braking mechanism having relatively movable parts connected to the towing mechanism and to the trailer, with means interconnecting said parts for selectively placing them under tension as required to permit the trailers of different sizes and weights to be backed up by the towing vehicle without causing the trailer brakes to be set.

Yet another object of this invention is to provide an improved trailer braking device having a socket connection for receiving a ball member mounted on the towing vehicle, and in which a portion of the brake actuating mechanism is utilized to securely lock the parts of the ball and socket joint in place.

A still further object of this invention is to provide an improved trailer brake actuating mechanism having both mechanically and hydraulically actuatable portions which can be operated independently to set trailer brakes, and wherein separate mechanical and electrical means are utilized to render both said hydraulically and mechanically actuatable brake actuators inoperative for permitting the towing vehicle to pull or back up the trailer through a straight mechanical connection.

The above and other objects and advantages of this invention will become apparent from the following description, taken in conjunction with the accompanying drawings illustrating a preferred embodiment thereof, in which:

FIGURE 1 is a side elevational view of a towing vehicle and trailer interconnected by an improved trailer brake actuating mechanism, in accordance with this invention;

FIGURE 2 is an enlarged perspective view of the brake actuating mechanism of FIGURE 1, showing mechanical, electrical and hydraulic means thereof for effecting predetermined braking operations;

FIGURE 3 is a sectional view taken along the line 3—3 of FIGURE 2, illustrating the hydraulic means of this invention for setting the trailer brakes;

FIGURE 4 is a sectional view taken along the line 4—4 of FIGURE 3, illustrating the hydraulic means for actuating the trailer brakes, and further illustrating the cooperative relationship of the hydraulic and mechanical means for actuating the trailer brakes, and also for locking the brake actuating means of this invention to the towing vehicle;

FIGURE 5 is a sectional view taken along the line 5—5 of FIGURE 4, to illustrate details of the tension setting means of this invention;

Figure 6:
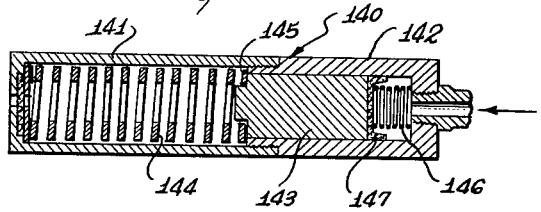
Figure 7:
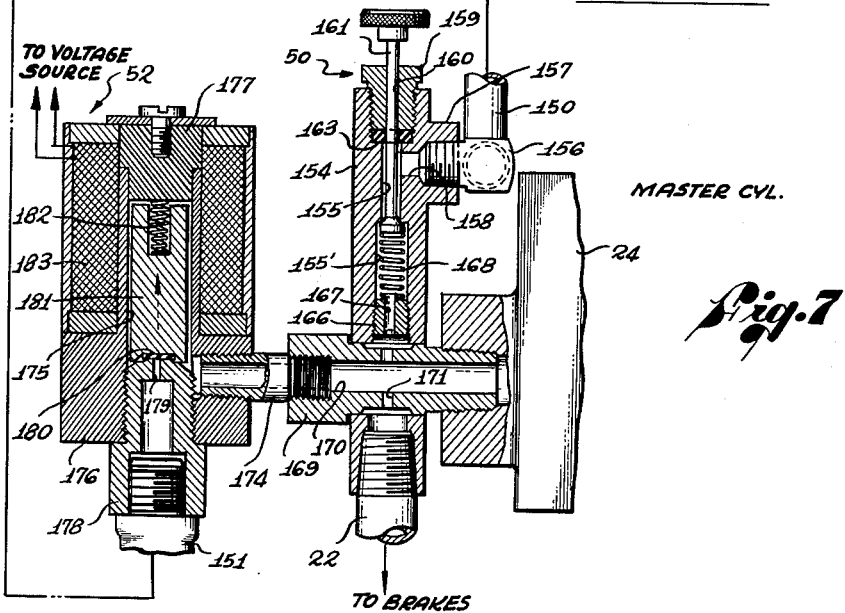

FIGURE 6 is a sectional view taken along the line 6—6 of FIGURE 2, illustrating means in accordance with this invention to prevent rupture of the hydraulic feed means used in conjunction with the hydraulic control of the brake actuating mechanism; and FIGURE 7 is an enlarged view of interconnected mechanical and electrical means of this invention for rendering inoperative the brake actuating functions.

Referring to FIGURE 1, a towing vehicle, shown as an automobile 10, has a bracket 12 extending from its rear bumper and supporting at its outer end a ball element 14, all in a conventional manner. The ball 14 fits in a mating spherical socket provided in one end of an elongated hitch element 16 of a trailer connector and braking mechanism 17. Surrounding the hitch element 16 at its opposite end, and extending over most of its length, is a sleeve 18 which is secured to a bracket 20 attached to a trailer vehicle 22. The hitch element 16 and the sleeve 18 are adapted for telescopic action. When the automobile 10 decelerates with respect to the trailer 22, the sleeve 18 is forced forward on the longitudinal element 16.

The master brake cylinder 24 for the trailer brakes is attached to the sleeve 18. When the automobile 10 decelerates to cause movement of the sleeve 18 above described, the rearwardly extending end of the elongated hitch element 16 actuates the master brake cylinder 24, thereby to establish hydraulic pressure, acting through conduits indicated at 26, to apply the brakes of the wheels 28 of the trailer 22.

The hitch element 16 and the sleeve 18 are pre-loaded so that upon relative movement of the automobile 10 and trailer 22 toward each other, a predetermined force is required to effect telescopic action of the longitudinal element 16 and sleeve 18 before the trailer brakes will be actuated. In this connection, an external, manually operable control member 30 is provided to establish the described preloading between parts. The control member 30 is pivotally mounted on the sleeve 18 and is adapted to actuate means within the hitch element 16 to effect the desired tension. The exact means for accomplishing this function will be described more fully hereinafter.

One important aspect of the feature of establishing a pre-selected tension between the longitudinal element 16 and the sleeve 18 is to make the trailer brake actuating means of this invention adjustable to accommodate different trailer loads which may be operated by the automobile 10 when backing up. Thus, the control member 30 is placed in a position which will provide sufficient tension so that, for the particular weight of the trailer, the automobile can be backed up smoothly without the frustration of having the trailer brakes set in such a maneuver.

Carried on the control member 30 is a pivotable detent or latch member 32, which is the means for locking the control member 30 in the desired position. The detent member 32 is linked, as by a chain 34, to the automobile 10, as by connecting the chain 34 around the rear bumper. If, for any reason, the mechanical connection between the automobile 10 and the trailer 22 is broken, as for example if the ball 14 were broken off, the ensuing acceleration of the automobile 10, by virtue of the sudden release thereof from the load being towed, would result in the chain 34 being pulled taut, thereby to disengage the detent 32.

The tension between the hitch element 16 and the sleeve 18 is such that upon release of the detent 32, the control member 30 will be pivoted forwardly, and the hitch element 16 telescoped rearwardly through the sleeve 18 to actuate the brake cylinder 24 and thereby cause the brakes of the trailer 22 to be set. The strength of the chain 34 is such that it will snap as the automobile 10 moves away. Thus, although the automobile 10 is accidentally separated from the trailer, the trailer will not be free to roll along the highway to cause damage to persons and property.

The brakes of the trailer may also be set in accordance with this invention when there is no relative movement between the automobile 10 and the trailer 22. To this end, a separate source of hydraulic pressure is mounted within the automobile 10, as indicated at 40. The source 40 is connected through a conduit, indicated at 42, which is connected at the rear of the automobile to the interior of the hitch element 16. A control valve 44 is conveniently located within the automobile, as by being mounted on the front of the dashboard adjacent the driver, for selectively applying the hydraulic pressure from the source 40 through the conduit 42, the hitch element 16 and the sleeve 18 to cause the brakes of the trailer to be actuated.

In this manner, the brakes of the trailer can be selectively set by the driver of the automobile on approaching a dangerous curve or a steep incline, thereby to aid in slowing down both vehicles so they can proceed at a safe speed, and thereby avoid a wreck.

Also associated with the braking mechanism 17 are a manually operable valve 50 and a solenoid operated valve 52 coupled to the brake cylinder 24. These valves are provided for the purpose of releasing pressure within the brake cylinder 24 so that it will not be effective to apply the brakes of the trailer. In other words, the valves 50, 52 constitute respective mechanical and electrical control means for rendering the brake actuating mechanism ineffective to control the brakes of the trailer.

To deactivate the braking mechanism, the manually operable valve 50 can, of course, be actuated any time the vehicles are stopped. However, if it is desired at any time to deactivate the brake actuating mechanism without leaving the automobile, the solenoid valve 52 may be energized to perform this function by the turning of a control switch therefor located on the dashboard adjacent the driver, as indicated at 54. Alternatively, where a house trailer is being towed, the switch 54 may be mounted in the trailer and actuated by a person therein to effect deactivation of the brake actuating mechanism.

FIGURES 2 through 5 show details of construction of operatively related parts associated with the hitch element 16 and the sleeve 18 to operate the trailer brakes in the various ways heretofore described. To effect manipulation and positioning of the control member 30, the sleeve 18 is provided with a unitary, vertically disposed plate member 60. The upper edge of the plate 60 is curved, and is provided with a plurality of spaced notches 61 along its rear portion. The control member 30 is a bifurcated element, comprising a handle 62 which has its lower end spaced slightly from the curved edge of the plate 60. The forks 63, 64 curve downwardly on opposite sides of the sleeve 18, and are pivoted to the sleeve at diametrically opposed points 65, 66.

The detent member 32 for holding the handle 62 in a desired position has a pair of parallel fingers 67, 68 which straddle the handle 62 adjacent its lower end. At their forward ends, the fingers 67, 68 are pivotally secured, as at 69, to a forwardly extending projection 70 of the handle 62. At its lower end and behind the arm 62, the detent member 32 has a finger projection 71 which is shaped to mate with the notches 61 in the plate 60. With the finger projection 71 disposed in a notch 61, the handle 62 is held in the position selected.

To further insure that the detent 32 will be retained in a notch in which it is selectively placed, a spring 72 is disposed between the detent and the arm 62. The spring 72 biases the detent 32 away from the arm 62, and hence in a direction in which the finger projection 71 thereof is kept securely located in the selected notch.

Tension is established between the hitch element 16 and the sleeve 18 by operation of the control member 30 to selectively position spring-biased members disposed within the hitch element 16. Additionally, and in accordance with this invention, operation of the control member 30 causes the ball 14 to be locked within the mating spherical socket 74 (shown in FIGURES 3 and 4).

To achieve the above-mentioned effects of operation of the control member 30, the lower ends of the forks 63, 64 are secured, as at 75 and 76, to the ends of respective link elements 77 and 78. At their opposite ends, the link elements 77 and 78 are connected to the ends of respective pins 79 and 80 which extend through slots 81 and 82 into the interior of the hitch element 16.

The inner ends of the pins 79 and 80 are threaded into a piston-like member, shown as a short cylindrical element 83, which is adapted for sliding movement within a sleeve 84 disposed within the hitch element 16. The sleeve 84 is provided with longitudinal slots 81', 82', which preferably are coextensive with the slots 81 and 82. Thus, upon manipulation of the handle 62 of the control member 30, the pins 79, 80 will be caused to move along the slots 81, 82 to carry the cylindrical element 83 longitudinally within the sleeve 84.

In mounting the pins 79 and 80 in place, they are inserted through openings in the ends of the link elements 77, 78. Respective springs 86, 87 (see FIGURE 3) are disposed between the ends of the link elements 77, 78 and the outer surface of the hitch element 16, so that the ends of the pins 79, 80 pass through the springs upon being inserted through the slots 81, 82. The springs 86, 87 are under compression, so as to exert an outward bias against the ends of the link elements 77, 78, while the pins 79, 80 are being assembled. Such biasing aids in adjusting the positions of the pins 79, 80 so that the link elements 77, 78 will be maintained parallel and free to move without binding.

Dust covers for the slots 81', 82' are provided by felt strips 88, overlayed with a flanged cup 89 (see FIGURE 3) surrounding the pins 79, 80, which frictionally engages the strips, and moves them therewith. The strips are sufficiently long to insure that no part of the slots 81', 82' will be exposed to air. The parts within the hitch element 16 and sleeve 18 are lubricated with grease injected through respective grease fittings 16', 18'.

Within the hitch element 16, a rod-like member, shown as an elongated rod 90 threaded at both ends, is secured at one end to the cylinder 83, and at its opposite end to one end of an elongated hollow cylinder 91. The cylinder 83, the rod 90 and the cylinder 91 thus constitute one elongated slidable element.

Surrounding the cylinder 91, and secured thereto intermediate its ends, is a flanged member 92 for supporting one end of a spring 93. The opposite end of the spring 93 registers against a flanged disc element 94 which is slidably mounted on the rod 90. The flange of the disc 94 is of greater diameter than the sleeve 84, so that the spring 93 biases the disc 94 against the adjacent end of the sleeve 84.

Adjacent the end of the sleeve 84, the inner diameter of the hitch element 16 is enlarged as indicated at 95, to provide clearance for the flanged member 92, the spring 93, and the disc 94.

The forward end of the cylinder 84 is provided with a short, transverse projection 96 which extends from the chamber housing the sleeve and through an opening 98 into the lower portion of the socket 74. The upper edge of the projection 96 is shaped to the contour of the ball 14, as indicated at 97.

When the ball and socket connection is to be made, the control member 30 is in the forward position, indicated in phantom, and the sleeve 84 is free to be moved longitudinally under relatively small forces. When the ball 14 enters the socket 74, the ball is forced against the lower portion of the projection 96. This forces the sleeve 84 rearwardly against the tension of the spring 93 to allow the ball to enter the socket.

After the ball 14 moves up past the projection 96, the action of the spring 93 forces the sleeve 84 forward, whereupon the smooth upper edge 97 of the projection engages the ball below its center.

The projection is caused to lock the ball 14 within the socket 74 by locking the sleeve 84. This is accomplished by a locking device 99 in which a plunger 100 is inserted through mating openings 101, 102 in the hitch element 16 and the sleeve 84. The opening 102 in the sleeve 84 is aligned with the opening 101 in the hitch element 16 when the sleeve 84 is positioned with the projection 96 abutting the ball 14. If the tension of the spring 93 is insufficient to force the sleeve 84 to this position, the control member 30 may be employed for this purpose. Moving the control member slightly from the phantom position causes the cylinder 83, and hence the rear end of the spring 93, to be moved forward. This movement increases the force exerted against the sleeve 84 through the disc 94, thereby to force the sleeve 84 into the position where the projection 96 is in firm abutment with the ball 14.

The plunger 100 is slidably held in a housing 103 which is threadedly secured to the hitch element 16. The plunger is fixed to the lower end of a rod 104 which extends above the housing 103. Within the housing, the rod 104 is surrounded by a spring 105 which urges the plunger 100 downwardly. A control lever 106 is pivotally connected to the top of the rod 104; in one position of the lever 106, shown in phantom, the rod 104 is raised so that the plunger 100 is held clear of the opening 102 in the cylinder 84. After the ball 14 is seated in the socket 74, and the sleeve is in the position where the openings 101, 102 are aligned, the lever 106 is moved to a second position (shown in solid lines) where the plunger 100 extends through the opening 102. Thereafter, the ball cannot leave the socket.

The lower end of the plunger 100 does not extend past the inner wall of the sleeve 84. Therefore there is no possibility of interference by the plunger with the sliding movement of the cylinder 83.

After the ball 14 is locked within the socket 74, the control member 30 is moved rearwardly, and the finger 71 of the detent 32 is allowed to seat in a selected one of the notches 61. In this operation, the hand gripping of the handle 62 also holds the detent 32 against the handle. When the handle 62 is in the desired position, the detent 32 is allowed to move, under the spring bias, to seat the finger 71 in the desired notch 61.

It will be apparent that rearward movement of the control member 30 forces the cylinder 83 forward through the sleeve 84. Of course, the rod 90 and the cylinder 91 also move forward with the cylinder 83. Since flanged member 92 fixed to the cylinder 91 also moves forward, and since the disc 94 remains in abutment with the rear of the sleeve 84 (the rod 90 sliding through the disc 94), the distance between the flanged member 92 and the disc 94 is shortened. Therefore, the spring 93 is compressed.

When the detent 32 locks the control member 30 in a desired position, the spring 93 effectively places the hitch element 16 and the outer sleeve 18 under a predetermined tension, which must be overcome before there can be relative movement between the sleeve 18 and the hitch element 16. This tension corresponds to the trailer load with which it can be moved backward in a normal backing up maneuver. If the load is too heavy, and would cause telescoping in such a maneuver, the detent 32 is released and the handle 62 moved to a position where the tension is sufficiently less to permit backing up with that load. The detent 32 is lodged in the slot 61 to hold the handle in this new position.

Where the trailer is being towed and the towing vehicle decelerates, the forward momentum of the trailer must also exceed the established tension before the sleeve 18 will move along the hitch element 16. As previously described, telescopic action of the sleeve 18 and the hitch element 16 results in applying the brakes of the trailer. How this is accomplished will now be explained with reference to FIGURES 2 and 4.

A slidable piston 110 is positioned within the cylinder 91. The piston 110 is resiliently coupled to the cylinder 91 by a spring 111 and a cup element 112 of resilient material, such as rubber. The rear or bottom face of the cup 112 is in abutment with the front face of the piston 110. The spring 111 is seated at one end of the cup, and at its other end registers against the inner radial face 113 of the cylinder 91.

The rear face of the piston 110 is countersunk to receive one end of a solid rod 114. As shown, this end of the rod 114 is a reduced diameter section 115 surrounded by a cup 116 of protective material, e.g., nylon, abutting the piston 110. To prevent lateral movement of the rod 114, a short hollow cylinder 117 is provided which fills the space between the inner wall of the cylinder 91 and the cup 116.

At the rear end of the cylinder 91, lateral movement of the rod 114 is obviated by surrounding washings 118 disposed between a shoulder 119 within the sleeve 91 and an adjacent snap ring 120.

The rear of the cylinder 91 abuts a disc 121 which is slidably received on the rod. The disc 121 is a stop for limting forward movement of the rod 114, and for this purpose, the rod is provided with an enlarged diameter section 122 which abuts the rear face of the disc 121.

Adjacent the disc 121 is another disc 123 which has a flange 124 for supporting one end of a compression spring 125. The opposite end of the spring abuts the inner face of a support element 126 to which the brake cylinder 24 is secured, as by a plate member 127.

The disc 121 abuts an inner shoulder 128 of the hitch element 16. Accordingly, upon telescoping of the hitch element 16 and the outer sleeve 18, the relative movement of the hitch element 16 is followed by the discs 121, 123 and the rod 114. Such relative movement between the hitch element and the sleeve 18, of course, results in compression of the spring. The spring functions to cushion the impact of the outer end of the rod 114 against the actuator of the brake cylinder 24.

The actuator for the brake cylinder 24 is shown as a push rod 129, the end of which is engaged by the end of the rod 114, as indicated in FIGURE 2. Preferably, the end of the rod 114 is covered with a cup 130 of pliable material, such as nylon, to help minimize damage to the parts. Thus, the rearward movement of the hitch element 16, relative to the sleeve 18, causes the rod 114 to actuate the push rod 129, and hydraulic pressure is applied through the conduits 26 to the trailer brakes.

It should be noted that when the rod 114 is moved as above described, the piston 110 moves with it because of the action of the spring 111. Therefore, the end 115 of the rod cannot become disengaged, so as to undergo lateral movement within the sleeve 91, and slip off the end of the push rod 129.

In addition to the movement of the rod 114 upon relative movement between the hitch element and the sleeve 18, the rod can also be moved independently under hydraulic pressure. In such movement, the rod 114 slides with respect to the disc 121. In order to cause the spring 125 to be compressed during such movement, the rod 114 has a reduced diameter section 131 adjacent the enlarged diameter section 122, and the central opening of the disc 123 follows the contours of these sections. Thus, independent movement of the rod carries the disc 123 with it, effecting compression of the spring in the same manner as when the hitch element and the sleeve 18 telescope.

Referring to FIGURES 3 and 4, the rod 90 has a central opening 135 extending along its length. Thus, the end of the rod 90 secured in the cylinder 91 is in fluid communication with the space in which the spring 111 is located.

At the forward end of the rod 90, the central opening 135 is in fluid communication with an opening 136 in the cylinder 83. The opening 136 in turn is in fluid communication with an opening 137 at right angles thereto in the cylinder 83. One of the pins 80 connected to the cylinder 83 is provided with a central opening 138 extending the length thereof. A fitting 139 is threadedly secured to the outer end of the pin 80 for connecting the conduit 42 (FIGURE 1) thereto. Thus, the source of hydraulic pressure within the towing vehicle 10 is in communication with the forward end of the piston 110.

The control valve 44 is operated to cause fluid under pressure to pass through the openings 138, 137, 136 and 135 to move the piston 110 rearwardly. Such movement causes the rod 114 to be moved with the piston, thereby to actuate the push rod 129 and cause the trailer brakes to be applied in the manner previously described.

Release of the control valve 44 permits the spring 125 to move the rod 114, and hence the piston 110, in the forward direction, thereby to release the trailer brakes.

It is, therefore, readily apparent that this invention provides a greatly improved mechanism for actuating trailer brakes automatically, and a unique means for selectively applying trailer brakes independently of the automatic means.

To prevent rupture in the feed line or conduit 42, a surge valve 140 is connected at one end in the path of the fluid. The surge valve employs only simple mechanical parts, as shown in FIGURE 6. These parts are comprised of housing which is in two cylindrical parts 141, 142. The part 142 is threaded into the part 141. The central opening in the end wall of the part 141, which is of smaller diameter than the central opening of the end wall of the part 142, includes a solid slidable piston 143. Disposed within the part 141 is a compression spring 144, which is contained between the closed end of the part 141 and the shoulder 145 provided by the part 142.

Intermediate the inlet end of the part 142 and the piston 143 is a small compression spring 146, which urges the piston against the spring 144. A cup 147 which preferably is of softer material than the piston, is disposed between the inner end of the spring 146 and the piston.

A T-connection 148 is employed for connecting the fitting 139 from the pin 80, the conduit 42, and the surge valve 140. As will be apparent from FIGURE 6, any undue increase in fluid pressure within the conduit 42 will cause the piston 143 to move inwardly against the action of the spring 144. By so doing, the surge valve 140 constitutes a pressure relief point in the line which obviates rupture of the line in the presence of sudden pressure inceases which may be above the line capacity.

Additional features of the invention reside in the mechanical and electrical means 50, 52 for preventing operation of the trailer brakes upon movement of the rod 114. As shown in FIGURES 2 and 7, connections are made to the reservoir (not shown) in the master brake cylinder 24 from each of the deactivating means 50, 52. The connections are shown in FIGURE 2 as conduit couplings 150, 151, to a connection 152 to the reservoir.

The purpose of each of the control means 50, 52 is to release pressure within the master brake cylinder and permit fluid to be expelled therefrom and returned to its reservoir. Manifestly, when the pressure is released, actuation of the push rod 129 will not be effective to apply the brakes of the trailer.

Referring to FIGURE 7, the mechanical means 50 for preventing the trailer brakes from being applied comprises a housing 154 having a central opening 155 in fluid communication with the reservoir through the coupling 150. For this purpose, an elbow fitting 156 is connected to the coupling 150 and is threaded into a boss 157 on the housing. The boss 157 has a central opening which extends as at 158 so as to be in fluid communication with the opening 155.

At the upper end of the housing 154, and threaded therein, is a short cylindrical element 159 which has a central opening 160 of slightly smaller diameter than the opening 155. A rod 161 of substantially the diameter of the opening 160 extends through the openings 155, 160, and an external knob 162 is provided for selectively positioning the rod 161.

At the lower end of the cylindrical element 159, an O-ring seal 163 surrounds the rod 161, and serves to prevent fluid from escaping through the top of the housing.

At its lower end, the opening 155 enlarges, as indicated at 155'. The lower end of the rod 161 terminates in a valve member 164 which has a conical surface 165. When the rod 161 is in an uppermost position, the conical surface 165 is seated against the transition from the opening 155 to the enlarged opening 155'. In this position of the rod 161, fluid cannot pass from the enlarged opening 155' and through the opening 155 to the reservoir of the master brake cylinder.

An insert 166 having a small central opening 167 is threaded into the housing 164, and a small spring 168 is disposed in the opening 155'. The spring tension is such that the rod 161, by virtue of its frictional engagement with the interior wall of the cylindrical element 159, and with the seal 163, will retain its position upon being pushed down a slight amount.

Intermediate the insert and the lower end of the housing 161 is a transverse fitting 169 which has a central opening 170 extending the length thereof, and a transverse diametral opening 171 in fluid communication with the opening 170. One end of the fitting 169 is threaded in a boss 172 through which fluid from the cylinder 24 passes.

The lower end of the transverse opening 171 empties into the conduit 22, which is threaded into the lower end of the housing 154. Thus, when the rod 161 is moved from its uppermost position to admit fluid to the brake cylinder reservoir, pressure through the conduit 22 is released. When such pressure is released, the trailer brakes cannot be applied, as has been explained.

The fitting 169 is also connected through a hollow threaded element 174 to the central opening 175 within a housing 176. The upper end of the opening 175 is closed off by a closure element 177. An insert 178, which is in fluid communication with the brake cylinder reservoir, is threaded into the bottom of the housing 176.

The inner end of the insert 178 has a restricted opening 179 which is covered by a disc seal 180. The seal 180 is affixed to the lower end of an armature 181, which is slidably disposed within the opening 175. A compression spring 182 is positioned between the insert 177 and the upper end of the armature 181, so as to bias the armature downwardly and keep the seal 180 over the opening 179.

A solenoid coil 183 surrounds the housing 176 in the vicinity of the armature 181. The ends of the coil 183 are connected to a voltage source, as indicated. When the coil is energized, the armature 181 is raised, against the spring 182. This action establishes fluid communication between the restricted opening 179 (and hence the brake cylinder reservoir), and the brake cylinder 24 through the fitting 169. As with the downward movement of the rod 161 previously described, the upward movement of the armature 181 causes the pressure through the conduit 22 to be released.

One feature that will be apparent is that the armature 181, being directly in the path of the fluid flow, constitutes both a valve and an armature.

As previously described, the rod 161 is actuated when the towing vehicle and trailer are stopped. If the vehicles are in motion, the driver of the towing vehicle (or a person in the trailer) can actuate a switch to energize the coil 183 for preventing the trailer brakes from being applied.

Another way of preventing the automatic application of the trailer brakes is to lock the sleeve 18 and the hitch element 16. To this end, and referring again to FIGURE 4, a small cylindrical housing 186 is threaded into the sleeve 18. The central opening within the housing 186 is aligned with a mating opening in the hitch element 16 when the control member 30 is in its forwardmost position. A spring-biased key member 187 is actuatable by an external control lever 188 pivoted thereto, as at 189. With the lever 188 in one position, shown in solid lines, the key member 187 is seated in the mating openings in the sleeve 18 and the hitch element 16, thereby locking these elements against telescopic movement. When the lever 188 is moved to a second position, as indicated in phantom, the key member 187 is clear of the hitch element 16, thereby to permit telescoping of these parts.

A further precaution, to prevent rotation of the sleeve 18 and the hitch element 16, is the provision of a longitudinal groove 190 (see FIGURE 4) in the lateral surface of the hitch element, and a pin 191 extending through the sleeve 18 and into such groove. As will be apparent, this provision insures that the sleeve 18 and/or the hitch element 16 can undergo axial movement only.

While I have illustrated one embodiment of means to produce the desired results with my invention, various modifications will be apparent to those skilled in the art which fall within the spirit and scope of my invention. It will also be apparent that the brake actuating means of this invention is adapted for controlling electrically and air-operated brakes of trailer vehicles, as well as the hydraulically operated brakes described herein. Therefore, I do not intend that my invention be limited, except as defined by the appended claims.

I claim:

1. A trailer connector and brake actuating mechanism comprising: an elongated hitch element having a longitudinal opening extending from one end and terminating adjacent the opposite end thereof, said hitch element having a transverse ball-receiving opening intermediate said opposite end and the adjacent end of said longitudinal opening, said hitch element having an opening intermediate and providing communication between said transverse opening and the adjacent end of said longitudinal opening; a latching sleeve slidable in said longitudinal opening and having at one end a projection located in said intermediate opening, said projection in the innermost position of said latching sleeve extending into said transverse opening to a position to obstruct passage of a ball out of said transverse opening; a sleeve element to be attached to the trailer surrounding said hitch element along a substantial portion of its length from the end opposite said one end of said hitch element; actuating means for the brake actuating mechanism extending through said sleeve element and hitch element and into said latching sleeve; a compression spring within said hitch element compressed between the end of said latching sleeve opposite said projection and a portion of said actuating means; and means carried by said sleeve element and connected to the portion of said actuating means that extends into said latching sleeve to selectively position said actuating means and said spring for simultaneously forcing said projection into said transverse opening and establishing a condition requiring a predetermined force against said hitch element and said sleeve element to effect relative movement between said hitch element and said sleeve element.

2. A combination as defined in claim 1, wherein said actuating means includes a rod-like member, means for sliding said rod-like member in said latching sleeve; a lever in said positioning means, means pivotally mounting said lever on said sleeve element; detent means connected between said sleeve element and said lever for releasably holding said lever in any of a number of desired positions; a piston-like member integral with said rod-like member and being slidable in said latching sleeve; link means between said lever and said piston-like member; and an element adjacent to and actuatable by said rod-like member to operate the brake actuating mechanism.

3. A combination as defined in claim 2, wherein said lever is a bifurcated element with legs astride said sleeve element, wherein said hitch element is provided with opposed elongated slots; a pair of pins extending through said slots and into said piston-like member; and wherein the link means are connected between the legs of said lever and said pins.

4. A combination as defined in claim 3, wherein said element for operating the brake actuating mechanism is movable independently of said rod-like member; and means for actuating the element and the brake actuating mechanism independently of telescoping action between said hitch element and said sleeve element, including port connections through one of said pins, said piston-like member, and said rod-like member, said port connections being adapted to apply hydraulic pressure from a source exteriorly of said hitch element to said element for operating the brake actuating mechanism.

References Cited in the file of this patent

UNITED STATES PATENTS

| | | |
|---|---|---|
| 2,134,931 | Salerno | Nov. 1, 1938 |
| 2,149,189 | Shaffer | Feb. 28, 1939 |
| 2,261,220 | Brown | Nov. 4, 1941 |
| 2,320,585 | Gill et al. | June 1, 1943 |
| 2,399,746 | Klaus | May 7, 1946 |
| 2,476,003 | Symmonds | July 12, 1949 |
| 2,523,500 | Davey et al. | Sept. 26, 1950 |
| 2,704,585 | Stromberg | Mar. 22, 1955 |
| 2,834,437 | Davids | May 13, 1958 |
| 2,848,074 | Puddy | Aug. 19, 1958 |
| 2,878,036 | Simmons | Mar. 17, 1959 |